US007092074B2

(12) United States Patent
Kawai et al.

(10) Patent No.: US 7,092,074 B2
(45) Date of Patent: Aug. 15, 2006

(54) PAPER FEEDING APPARATUS AND IMAGE FORMING APPARATUS INCLUDING THE SAME

(75) Inventors: Ryoichi Kawai, Nara (JP); Hideaki Kobayashi, Nara (JP); Jun Hiraoka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 83 days.

(21) Appl. No.: 10/712,094

(22) Filed: Nov. 14, 2003

(65) Prior Publication Data

US 2004/0145719 A1 Jul. 29, 2004

(30) Foreign Application Priority Data

Nov. 15, 2002 (JP) .......................... P2002-332754

(51) Int. Cl.
*G03B 27/00* (2006.01)
*G03B 27/32* (2006.01)

(52) U.S. Cl. ........................................ 355/407; 355/24

(58) Field of Classification Search ................ 355/407, 355/24, 40, 72; 271/3.14, 8.1, 18
See application file for complete search history.

(56) References Cited

U.S. PATENT DOCUMENTS 5,204,716 A * 4/1993 Kasahara et al. ............. 355/24
6,293,670 B1 * 9/2001 Taniguro et al. ............ 347/104

FOREIGN PATENT DOCUMENTS

JP 1-75050 U 5/1989

* cited by examiner

*Primary Examiner*—Peter B. Kim
(74) *Attorney, Agent, or Firm*—Birch, Stewart, Kolasch & Birch, LLP

(57) ABSTRACT

Sheets of recording paper are stacked and put on a push-up plate, and the uppermost recording paper is moved by pickup rollers and is separated by separation pawls. The separated recording paper is further moved by the pickup rollers so as to be carried out to the conveyance path between an upper guide and a lower guide. Notches are provided in those regions of the lower guide which correspond to the corner parts of the recording paper. Owing to the notches, the corner parts of the recording paper deformed by the separation pawls do not come into touch with the lower guide, so that the bending and jamming of the recording paper can be prevented from occurring.

10 Claims, 9 Drawing Sheets

PAPER FEEDING APPARATUS AND IMAGE FORMING APPARATUS INCLUDING THE SAME

BACKGROUND OF THE INVENTION

1. Field of the Invention

The present invention relates to a paper feeding apparatus which holds sheet-like recording media, and which successively feeds the recording media to an image forming section, and an image forming apparatus which includes the paper feeding apparatus.

2. Description of the Related Art

In an image forming apparatus such as a copying machine, printer or facsimile apparatus, when sheet-like recording media for printing images thereon, such as paper or OHP film, are used in large quantities, a paper feeding apparatus is employed which holds the plurality of recording media beforehand so as to feed them in succession.

The paper feeding apparatus comprises an apparatus body and a recording paper case. The recording paper case is detachable from the apparatus body in order to replenish the recording paper.

FIGS. 7A and 7B are schematic views showing the conveyance mechanism of a paper feeding apparatus 100. FIG. 7A is a plan view, while FIG. 7B is a side sectional view. The paper feeding apparatus 100 comprises an apparatus body 101, and a recording paper case 102. The apparatus body 101 has pickup rollers 103, an upper guide 104, a lower guide 105, a conveyance roller 106, and a pinch roller 107. The recording paper case 102 has separation pawls 108, a push-up plate 109, and a spring 110. Incidentally, only components relevant to the conveyance mechanism in the paper feeding apparatus 100 are shown in FIGS. 7A and 7B. Besides, the upper guide 104, the conveyance roller 106, and the pinch roller 107 are omitted from FIG. 7A in order to facilitate understanding of the shape of the lower guide 105. Sheets of recording paper 200 are put on the push-up plate 109 included in the recording paper case 102, and the push-up plate 109 is pushed upwards by the spring 110. Owing to the upward push of the push-up plate 109, the corner parts of the uppermost recording paper 201 are pushed against the separation pawls 108.

In feeding the recording paper, the pickup rollers 103 included in the apparatus body 101 are rotated to carry out the uppermost recording paper 201 in a conveyance direction indicated by an arrow B. On this occasion, a frictional force acts between the uppermost recording paper 201 and the second uppermost recording paper, so that the second uppermost recording paper is about to move in the same direction as that of the uppermost recording paper. However, the movement is hampered by the separation pawls 108, and only the uppermost recording paper 201 is separated and carried to a guide section. A conveyance path is changed to be upward by the upper guide 104 and the lower guide 105. The recording paper 201, carried out by the rotations of the pickup rollers 103, is bent along the conveyance path, and the front end edge thereof reaches the conveyance roller 106 and the pinch roller 107. The conveyance roller 106 and the pinch roller 107 hold the front end part of the recording paper 201 therebetween, and carry out this recording paper to the conveyance path leading to an image forming section.

The reduction of an installation area is required of the image forming apparatus as the desire of users, and reduction in the size of the apparatus is a requisite for incarnating the desire. Accordingly, the conveyance path needs to be shortened to the utmost in a horizontal direction, and it must be abruptly changed as shown in FIG. 7B. Even when the path change is abrupt, recording paper is easily caused to follow up the path change in a case where guides exist before and behind the change part of the path, and where the recording paper moves along the path of comparatively small cross section. However, in a case as in the paper feeding apparatus 100 where the recording paper is conveyed from that peripheral space of the recording paper case 102 in which the movement of the recording paper is not constrained, to the path which is surrounded with the upper guide 104 and the lower guide 105, and where the path change is abrupt, drawbacks such as the bending and jamming of the recording paper occur at the change part of the path. When the corner parts of the front end of the recording paper touch the lower guide 105, the movement of the front end part of the recording paper is sometimes hampered by load resistance such as a frictional force which the recording paper receives from the lower guide 105. On this occasion, the rear part of the recording paper is further carried out by the pickup rollers 103, so that the corner parts of the front end of the recording paper are bent. Moreover, when the bent parts hitch on the guide or any other part to make the recording paper immobile, the paper jamming takes place.

According to a paper feeding apparatus stated in Japanese Unexamined Utility Model Publication JP-U 1-75050 (1989), an upper guide plate is shaped into a trapezoid whose upside is this side as viewed in a paper feed direction, and whose downside is the opposite side. Thus, recording paper is conveyed while its corner parts curled upwards are being broadened, so that the occurrence of the bending, jamming, etc. of the recording paper is relieved.

FIGS. 8A and 8B are views showing a state where the recording paper 200 is separated by the separation pawls 108. Although the middle part of the uppermost recording paper 201 is moved in the conveyance direction by the rotations of the pickup rollers 103, each corner part 201*a* of the recording paper has its movement limited by the separation pawl 108 and is flexed as shown in FIG. 8A. When the middle part of the recording paper 201 is further moved in the conveyance direction, the corner part 201*a* thereof is released from the separation pawl 108. The corner part 201*a*, however, remains flexed to continue a state where it is deformed downwards as shown in FIG. 8B. The corner part 201*a* deformed in this manner is more susceptible to the load resistance of the guide and to undergo the drawback. With the lapse of time, the corner part 201*a* is about to resume the original state where it is not deformed. However, when the conveyance speed of the recording paper 201 is raised in order to heighten the processing speed of the image forming apparatus, the deformed corner part 201*a* comes into touch with the lower guide 105 before resuming the original state, and the problem of the prior art, namely, the drawback of the paper jamming ascribable to the bending of the front end part of the recording paper becomes liable to occur. Besides, the paper feeding apparatus stated in JP-UM-A-1-75050 cannot attain the advantage in the case where the path has changed abruptly, or in the case where the corner part has been deformed downwards as in the deformation ascribable to the pawl separation.

SUMMARY OF THE INVENTION

An aspect of the invention is to provide a paper feeding apparatus which prevents the bending of paper, paper jamming, etc. from occurring, and an image forming apparatus which includes the paper feeding apparatus, and which can be made smaller in size and higher in processing speed.

The invention provides a paper feeding apparatus comprising:

holding means for holding a plurality of sheet-like recording media;

separation means for separating a single recording medium from the recording media held by the holding means;

movement means for moving the separated recording medium in a predetermined direction; and guide means for guiding the moving recording medium along a predetermined conveyance path by a remaining region except predetermined regions.

According to the invention, in feeding paper, the separation means separates the single recording medium from the plurality of sheet-like recording media stacked and held by the holding means. The movement means moves the separated recording medium in the predetermined direction. The moving recording medium is guided along the predetermined conveyance path by the guide means. In the case where the recording medium is separated by the separation means, parts of the separated recording medium are often deformed. In order to cope with this drawback, the guide means guides the moving recording medium along the predetermined conveyance path by the remaining region except the predetermined regions corresponding to the deformed parts of the recording medium.

Thus, the guide means can guide the recording medium without touching the deformed parts of this recording medium. Therefore, it is possible to prevent the bending and jamming of the recording medium from occurring, and it can be realized to reduce the size of the apparatus and to raise a paper feed speed.

According to the invention, it is possible to prevent the bending and jamming of the recording medium as arise when the deformed recording medium is guided by the guide means from occurring, and it can be realized to reduce the size of the apparatus and to raise a paper feed speed.

Besides, in the invention it is preferable that notches are provided in the predetermined regions.

Also, in the invention it is preferable that recesses are provided in the predetermined regions.

According to the invention, the notches or the recesses are provided in the predetermined regions of the guide means. Thus, the guide means can be easily realized.

Besides, in the invention it is preferable that the predetermined regions include regions which correspond to the corner parts of the recording medium to-be-guided.

According to the invention, the predetermined regions of the guide means include the regions which correspond to the corner parts of the recording medium to-be-guided.

In such a case where the separation means separates the recording medium by employing separation pawls, the corner parts of the recording medium are mainly deformed. The predetermined regions which do not contribute to the guide operation include the regions corresponding to the deformed corner parts, whereby the guide means can guide the recording medium without touching the deformed parts.

Further, the invention provides a paper feeding apparatus comprising:

holding means for stacking and holding a plurality of sheet-like recording media;

separation means for separating a single recording medium from the stacked recording media by separation pawls;

movement means for moving the separated recording medium in a predetermined direction; and guide means formed with a space for resuming original states of deformed parts of the recording medium having been deformed during the separation by the separation means, for guiding the moving recording medium along a predetermined conveyance path.

According to the invention, in feeding paper, the separation means separates the single recording medium from the plurality of sheet-like recording media stacked and held by the holding means. The movement means moves the separated recording medium in the predetermined direction. The moving recording medium is guided along the predetermined conveyance path by the guide means. In the case where the recording medium is separated using the separation pawls, the corner parts of the separated recording medium are deformed. The guide means, however, is formed with the space for resuming the deformed parts into the original states by elastic repulsive forces inherent in the recording medium.

Thus, it is possible to prevent the bending and jamming of the recording medium as arise when the deformed recording medium is guided by the guide means from occurring, and it can be realized to reduce the size of the apparatus and to raise a paper feed speed.

Still further, the invention provides an image forming apparatus comprising:

the paper feeding apparatus described above; and an image forming apparatus body for forming an image on the recording medium fed from the paper feeding apparatus.

According to the invention, the image forming apparatus body forms the image on the recording medium fed from the paper feeding apparatus. Thus, it is possible to prevent the bending and jamming of the recording medium as arises when the paper is fed from the paper feeding apparatus from occurring, and it can be realized to reduce the size of the apparatus and to raise an image forming processing speed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PRESENT INVENTION

Figure 1:
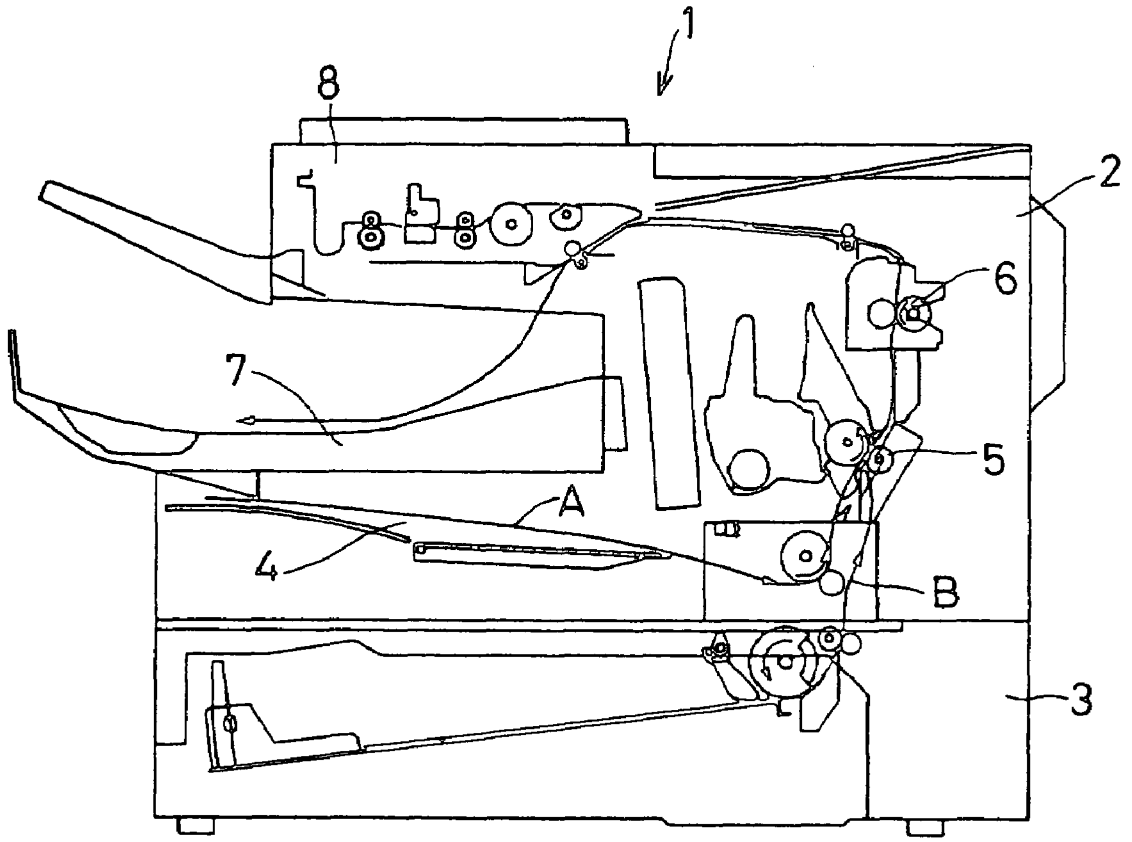
FIG. 1 is a sectional view showing the construction of an image forming apparatus which is one embodiment of the invention.

Now referring to the drawings, embodiments of the invention are described below.

FIG. 1 is a sectional view showing the construction of an image forming apparatus 1 which is an embodiment of the invention. The image forming apparatus 1 is actualized as a copying machine, a printer or the like. The image forming apparatus comprises an image forming apparatus body 2 and a paper feeding apparatus 3.

The image forming apparatus body 2 has a recording paper supply section 4, an image transfer section 5, an image fixing section 6, a recording paper discharge section 7, and an image read section 8. The recording paper supply section 4 is a tray which holds and supplies recording paper to print images thereon, and it is used in a case where the number of the required sheets of recording paper is comparatively small. The image transfer section 5 forms a toner image on the surface of a photosensitive drum on the basis of image data received from an information processing apparatus such as personal computer (PC), image data read by the image read section 8, or the likes, and it transfers the formed toner image onto the recording paper. The image fixing section 6 heats the recording paper bearing the toner image and melts a toner so as to fix the toner onto the surface of the recording paper. The recording paper discharge section 7 accumulates thereon the sheets of recording paper on which images have been printed. The image read section 8 receives reflected light from an original by a CCD (Charge Coupled Device) sensor or the like, and outputs the received information as image data. In a case where the recording paper is supplied from the recording paper supply section 4, it is conveyed along a conveyance path indicated by an arrow A. On the other hand, in a case where the recording paper is fed from the paper feeding apparatus 3, it is conveyed along a conveyance path indicated by an arrow B.

Figure 2:
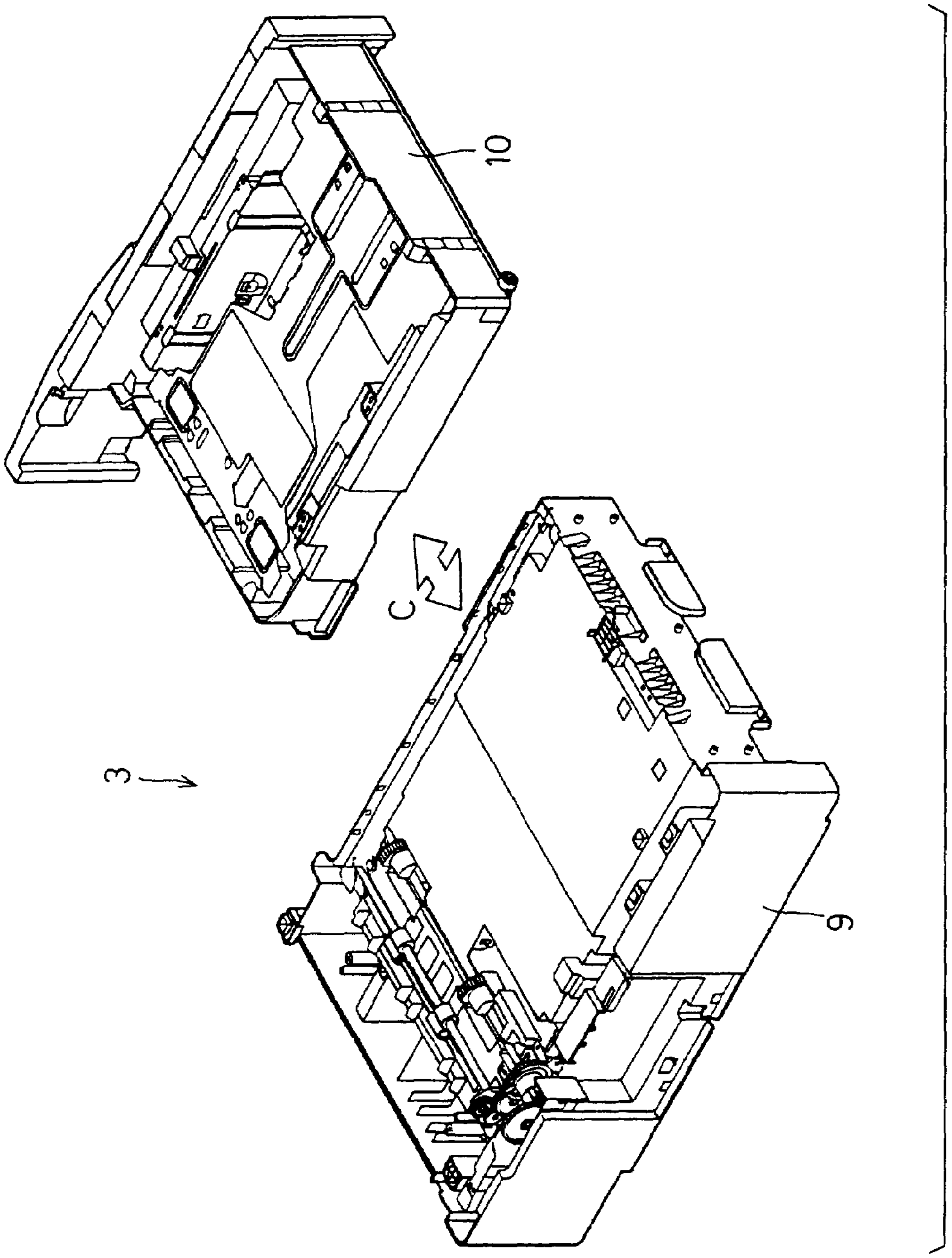
FIG. 2 is a perspective view showing the external appearance of a paper feeding apparatus.

FIG. 2 is a perspective view showing the external appearance of the paper feeding apparatus 3. The paper feeding apparatus 3 is separable into a paper feeding apparatus body 9 and a recording paper case 10. In order to facilitate the replenishment of the recording paper, the recording paper case 10 is detachable from a reception port formed in the side surface of the paper feeding apparatus body 9, in the direction of an arrow C indicated in the figure.

Figure 3A:
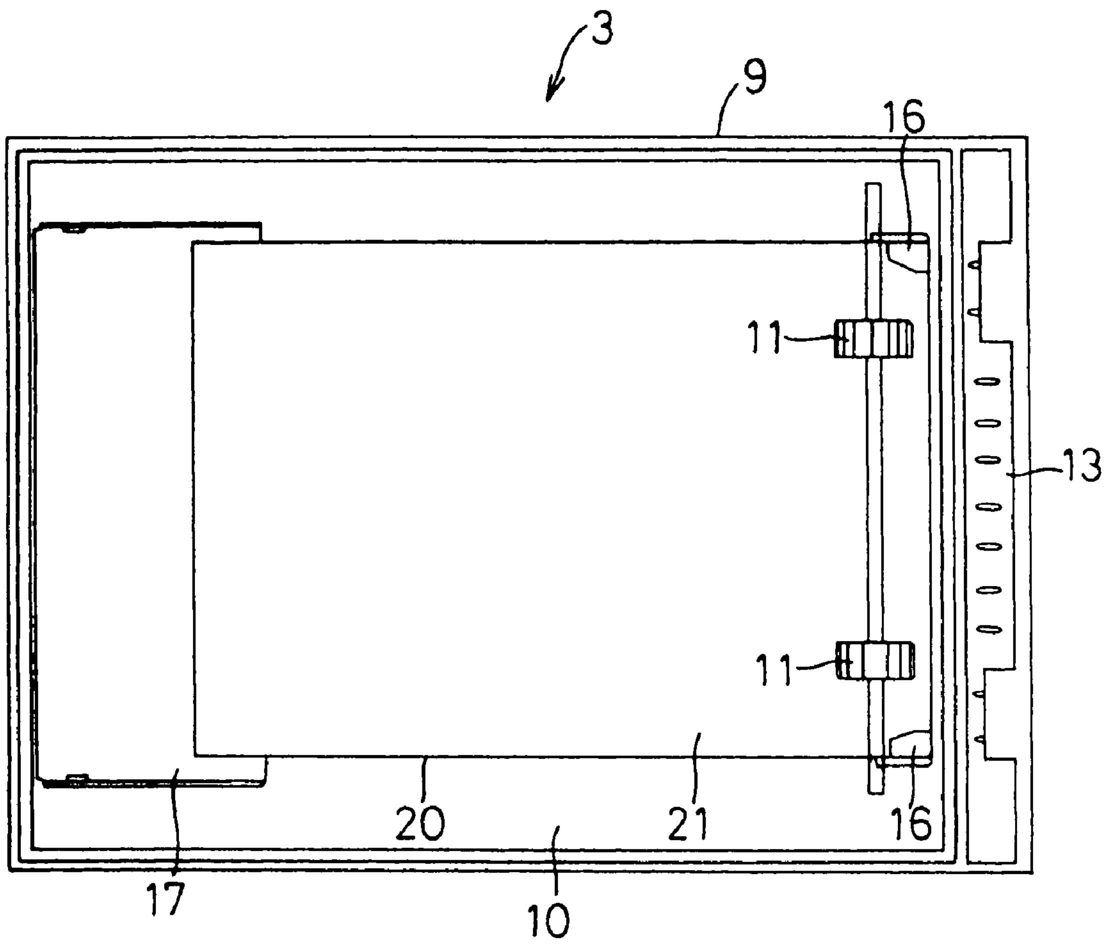
FIGS. 3A and 3B are schematic views showing the construction of the paper feeding apparatus.
Figure 3B:
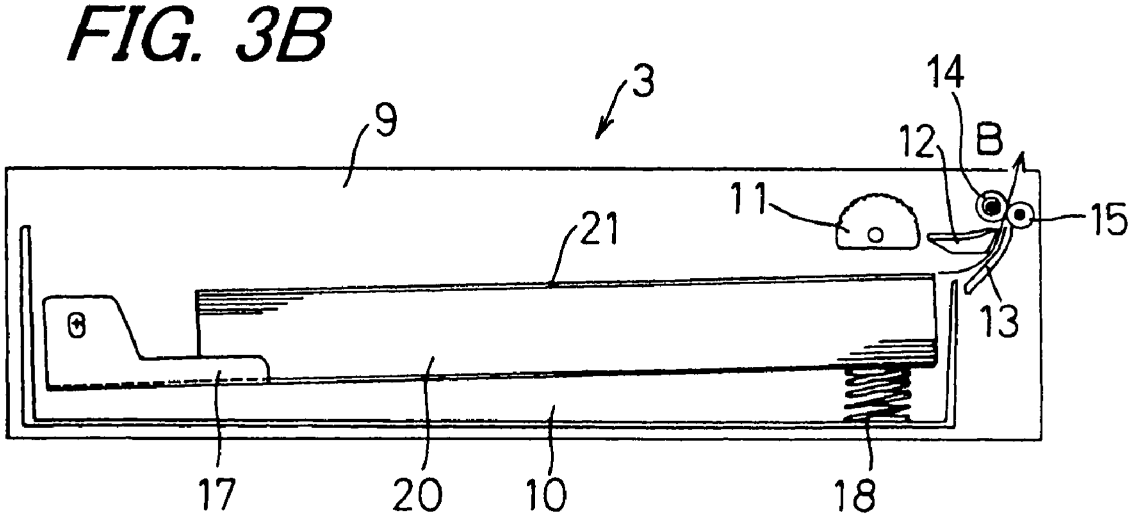

FIGS. 3A and 3B are schematic views showing the construction of the paper feeding apparatus 3. FIG. 3A shows a plan view, while FIG. 3B shows a side sectional view. The paper feeding apparatus body 9 has pickup rollers 11, an upper guide 12, a lower guide 13, a conveyance roller 14, and a pinch roller 15. The recording paper case 10 has separation pawls 16, a push-up plate 17, and a spring 18. Incidentally, only components relevant to a conveyance mechanism in the paper feeding apparatus 3 are shown in FIGS. 3A and 3B. Besides, the upper guide 12, the conveyance roller 14 and the pinch roller 15 are omitted from FIG. 3A in order to facilitate understanding the shape of the lower guide 13 to be explained later.

Now, there will be described the conveyance mechanism of the recording paper from the paper feeding apparatus 3 to the image forming apparatus body 2.

Sheets of recording paper 20 being sheet-like recording media are stacked and put on the push-up plate 17 being holding means, by a user beforehand. The push-up plate 17 is pushed upwards by the spring 18. Owing to the upward push of the push-up plate 17, the corners of the uppermost recording paper 21 among the put sheets of recording paper are pushed against the separation pawls 16. When the number of the sheets of recording paper on the push-up plate 17 is small, the compression magnitude of the spring 18 is small, and hence, a push-up force based on a spring force is weak. In contrast, when the number of the sheets of recording paper is large, the compression magnitude of the spring 18 is large, and hence, the push-up force becomes intense. Thus, a force by which the recording paper is pushed against the separation pawls 16, and a force by which it is pushed against the pickup rollers 11 are set so as to be held substantially constant irrespective of the number of the sheets of recording paper.

When an image forming process is started in the image processing apparatus body 2 by issuing a request for the conveyance of the recording paper 20 from the image processing apparatus body 2 to the paper feeding apparatus 3, a motor not shown is driven to rotate the pickup rollers 11 being movement means, about the axes thereof. The axes of the rotations of the pickup rollers 11 are arranged to be orthogonal to the conveyance direction of the recording paper. The pickup rollers 11 are rotated to touch the uppermost recording paper 21, whereby the recording paper 21 is moved in the conveyance direction indicated by the arrow B. As shown in FIG. 3B, the sectional shape of each pickup roller 11 as viewed in the direction of the axis thereof is the shape of a circle whose circumference is partially omitted. When the conveyance request is nullified, the pickup roller 11 is stopped so that the omitted circumferential part may oppose the recording paper. The position of each pickup roller 11 is set so that the circumferential part thereof may come into touch with the uppermost recording paper 21. In the absence of the conveyance request, therefore, the pickup roller 11 and the recording paper 21 are out of touch. Since the uppermost recording paper 21 is moved only during its touch with the pickup roller 11, the feed magnitude of the recording paper 21 based on one revolution of the pickup roller 11 can be adjusted by regulating the length of the circumferential part of the pickup roller 11. Usually, the feed magnitude is set sufficiently longer than a distance from the front end edge of the recording paper 20 put on the push-up plate 17, in the conveyance direction thereof, to the conveyance roller 14. In a case, for example, where the distance from the front end edge to the conveyance roller 14 is 40 mm, the length of that circumferential part of each pickup roller 11 which comes into touch with the recording paper 21, namely, the feed magnitude is set at 60 mm.

Since a frictional force acts between the uppermost recording paper 21 and the second uppermost recording paper, the second uppermost recording paper is about to move in the same direction as that of the uppermost recording paper 21. However, the movement is hampered by the separation pawls 16 being separation means, and only the uppermost recording paper 21 is separated and conveyed to the conveyance path which is formed by a guide section consisting of the upper guide 12 and the lower guide 13. As shown in FIG. 3B, the conveyance path is changed to be upward from a horizontal direction by the guide section. The recording paper 21 further carried out by the rotations of the pickup rollers 11 is bent along the conveyance path, and the front end edge thereof reaches the conveyance roller 14 and the pinch roller 15. The conveyance roller 14 is rotated about its axis by a motor, not shown, in interlocking with the pickup rollers 11. The pinch roller 15 is arranged in opposition to the conveyance roller 14, and it pushes the recording paper 21 against the conveyance roller 14, thereby to assist in the conveyance of the recording paper. The conveyance roller 14 and the pinch roller 15 hold therebetween the front end part of the recording paper having reached them, and they rotate to carry out this recording paper to the conveyance path inside the image processing apparatus body 2.

Incidentally, paper jamming in the conveyance path of the image forming apparatus 1 is detected as stated below. The pickup rollers 11 are rotated one revolution, and if the recording paper has passed is detected after a predetermined time period by a sensor which is disposed in the conveyance path inside the image forming apparatus body 2. In a case where the passage of the recording paper has not been detected, the pickup rollers 11 are rotated one revolution again, and the detecting operation is similarly made by the sensor. In a case where the passage of the recording paper has not been detected even by the second detecting operation, it is judged that the paper jamming has occurred in the paper feeding apparatus 3.

Figure 4:
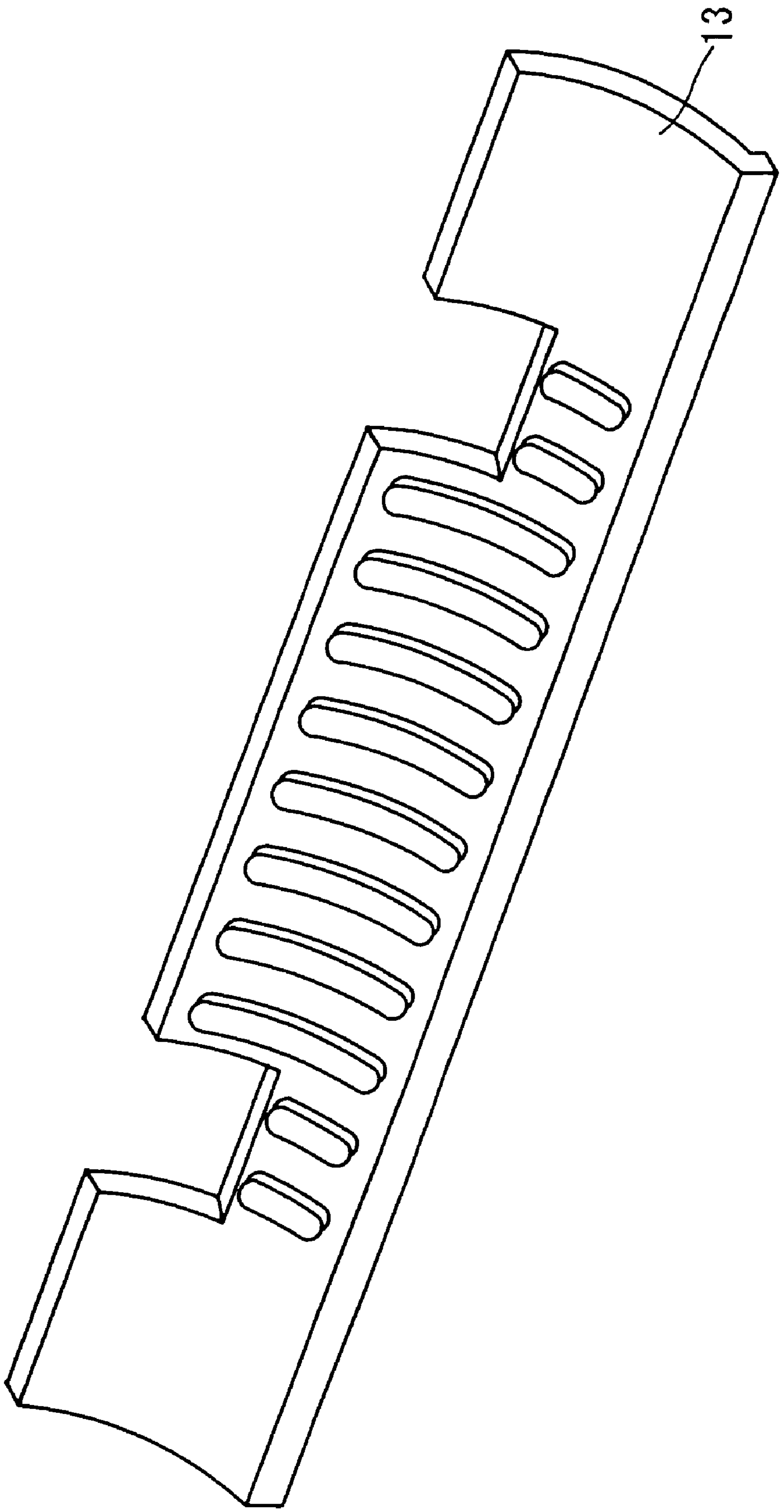
FIG. 4 is a perspective view showing the shape of a lower guide.
Figure 8A:
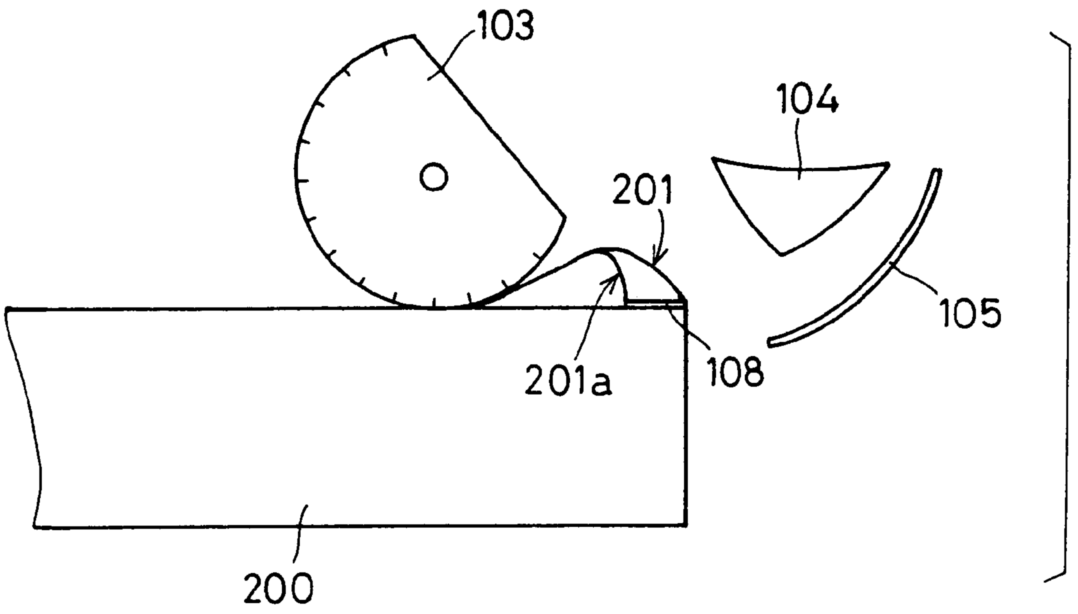
FIG. 8A PRIOR ART
FIGS. 8A and 8B are views showing a state where a sheet of recording paper is separated by separation pawls.
Figure 8B:
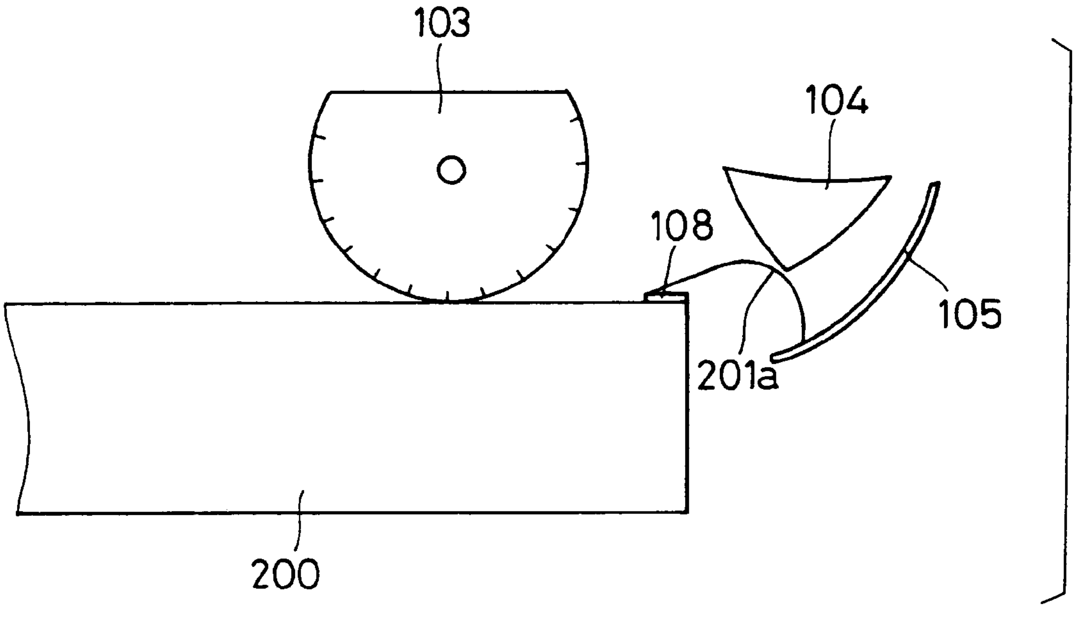
FIG. 8B PRIOR ART

In the conveyance path extending from over the push-up plate 17 to the conveyance roller 14, drawbacks such as the bending and jamming of the recording paper occur mainly in the guide section. A major cause for the occurrences of the drawbacks is the deformations of the corner parts of the recording paper as shown in FIGS. 8A and 8B. Parts of the lower guide 13 being guide means are cut away lest the deformed corner parts of the recording paper should touch the lower guide 13 in the conveyance of the recording paper. As shown in the plan view of FIG. 3A and the perspective view of FIG. 4, the lower guide 13 is notched at the two parts which the corner parts touch in the prior art in the conveyance of the recording paper. Thus, in the course in which the recording paper is conveyed, the deformed corner parts of the recording paper can resume their shapes by the elastic repulsive forces of their own, within a space which is defined by parts facing the notches of the lower guide 13, other components existing in the vicinity of the backside of the lower guide 13 opposite to the guide surface thereof, the inwalls of the paper feeding apparatus body 9 and the recording paper case 10, and so forth.

Figure 5A:
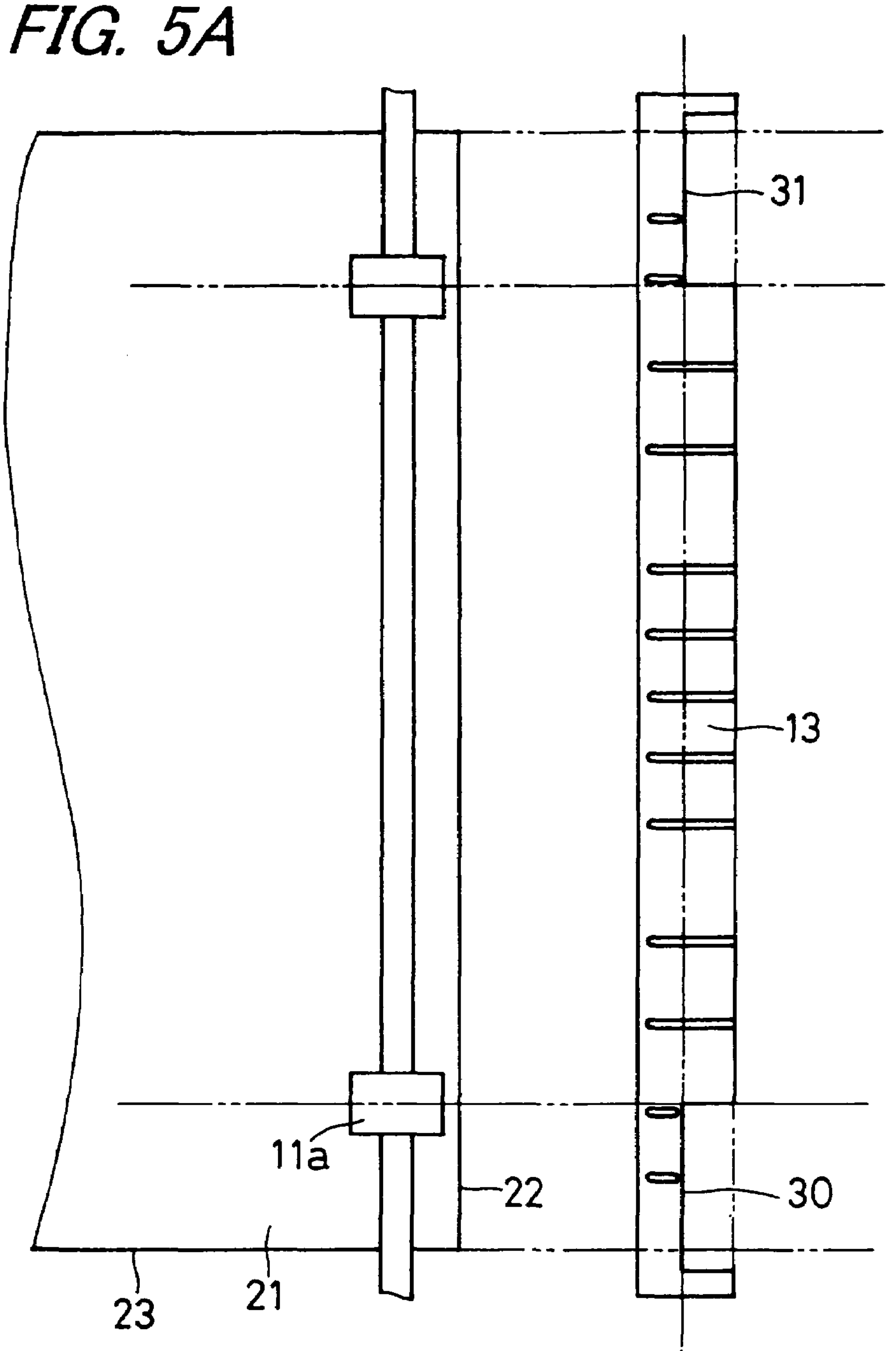
FIGS. 5A and 5B are views showing the shapes of the notches of the lower guide.
Figure 5B:
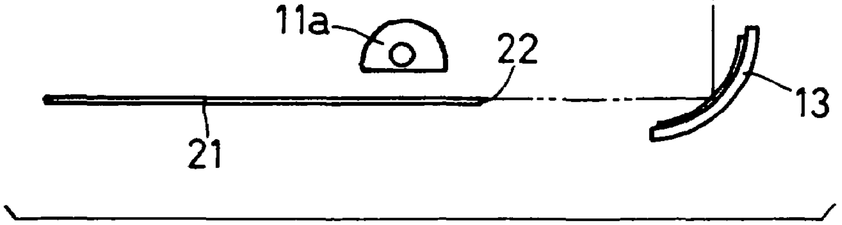

FIGS. 5A and 5B are views showing the shapes of the notches 30 and 31 of the lower guide 13. FIG. 5A shows a plan view, while FIG. 5B shows a side sectional view. The lower guide 13 is formed with the notches 30 and 31, the shapes of which are determined by the positions of the uppermost recording paper 21 among the sheets of recording paper put on the push-up plate 17, and the pickup roller 11.

The lower ends of the notches 30 and 31 are parts where the front end edge 22 of the recording paper 21 and the lower guide 13 abut when this recording paper has been carried out in the conveyance direction by the pickup rollers 11, and the upper ends thereof are even with the upper end of the lower guide 13. That is, the notches 30 and 31 are open toward the upper end of the lower guide 13. Regarding the widths of the notches, the width of the notch 30, for example, extends from outside a part where a plane containing the longer side 23 of the recording paper 21 and being orthogonal to the plane of this recording paper intersects the lower guide 13, to a part where a plane containing the widthwise center line or side surface of the pickup roller 11*a* intersects the lower guide 13, in order that the corner part of the recording paper 21 may be prevented from touching the lower guide 13. FIGS. 5A and 5B illustrate the case corresponding to the widthwise center line of the pickup roller 11*a*. The width of the notch 31 is determined similarly to that of the notch 30.

Even when the corner parts of the recording paper 21 have been deformed, the deformed parts exist within the width of the recording paper 21 without fail, and they do not come into existence outside this recording paper. Besides, the middle part of the recording paper 21 between the part thereof coming into touch with the pickup roller 11*a* and the part thereof coming into touch with the pickup roller 11*b* is not deformed by the forces of the pickup rollers 11 pressing this recording paper. Accordingly, when the notches being predetermined regions are formed as described above, the recording paper 21 is guided and conveyed by the widthwise middle part of the lower guide 13 as is a remaining region, without the touch of any deformed corner part of this recording paper with the lower guide 13. Thus, the bending or jamming of the recording paper attributed to the touch between the deformed corner part of the recording paper and the lower guide 13 can be prevented from occurring. It is accordingly permitted to cope with the abrupt change of the conveyance path attendant upon the reduction of the size of the apparatus, and the raise of the paper feed speed of the apparatus. The overall image forming processing speed of the image forming apparatus 1 can be heightened by raising the paper feed speed.

Incidentally, the notches may be in any shapes including the above shapes, and they are not restricted to rectangular shapes.

Figure 6A:
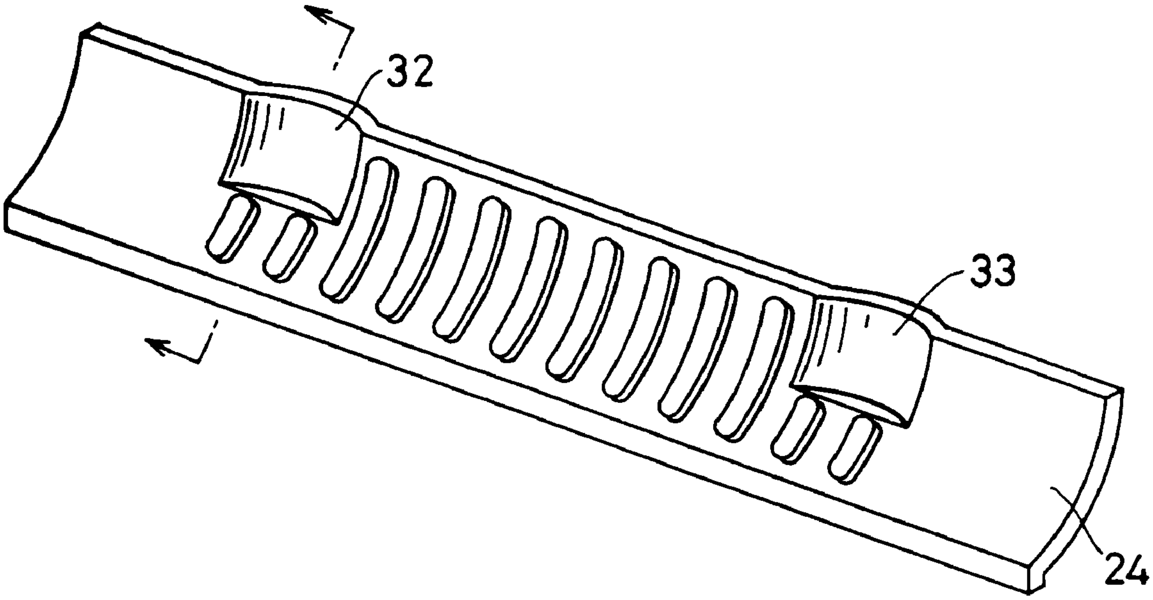
FIGS. 6A to 6D are views showing the shape of a lower guide.
Figure 6B:
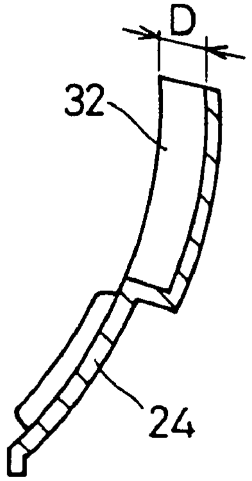

FIGS. 6A and 6B are views showing the shape of a lower guide 24 according to another embodiment of the invention. FIG. 6A is a perspective view of the lower guide 24, while FIG. 6B is a sectional view of the lower guide 24. The lower guide 24 does not have the notches as stated above, but it is formed with parts corresponding to the notches of the lower guide 13, as recesses 32 and 33 which are hollow in the conveyance direction of the recording paper. The depth D of each of the recesses 32 and 33 is set at a depth at which the deformed corner part of the recording paper does not touch the recess, for example, at 5 mm. When the recesses are formed in the lower guide 24, the deformed corner parts of the recording paper are resumed within spaces defined by the recesses, and the recording paper is guided and conveyed by the widthwise middle part of the lower guide 24, without the touch of any deformed part with the lower guide 24. Thus, the bending or jamming of the recording paper attributed to the touch between the deformed corner part of the recording paper and the lower guide 24 can be prevented from occurring. It is accordingly permitted to cope with the abrupt change of the conveyance path attendant upon the reduction of the size of the apparatus, and the raise of the paper feed speed of the apparatus. The overall image forming processing speed of the image forming apparatus 1 can be heightened by raising the paper feed speed.

Figure 6C:
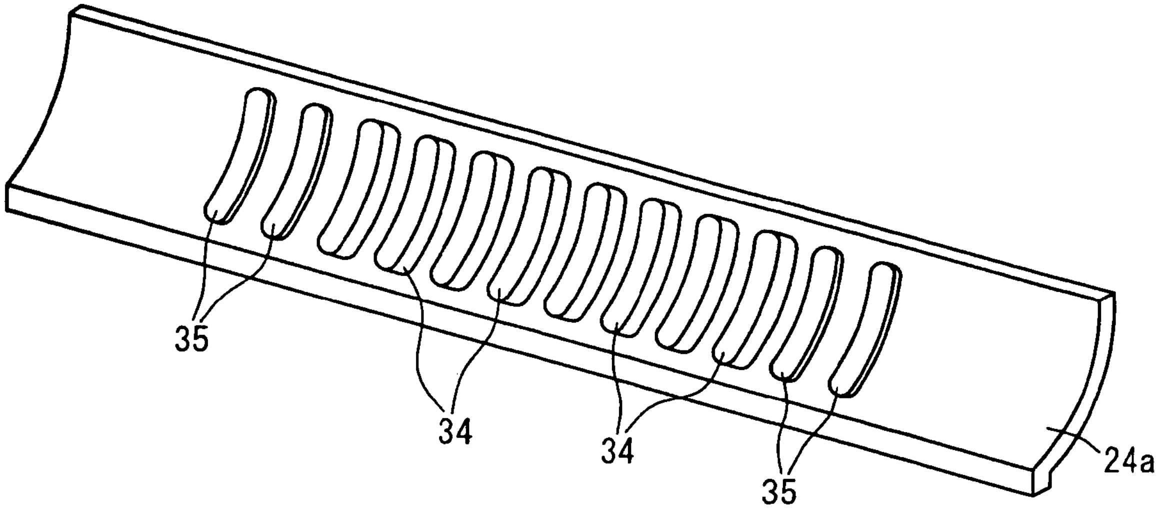
Figure 6D:
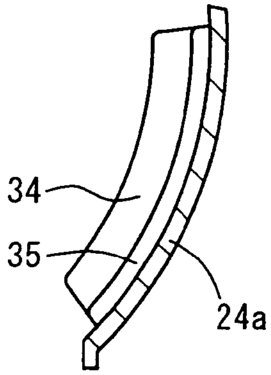
Figure 7A:
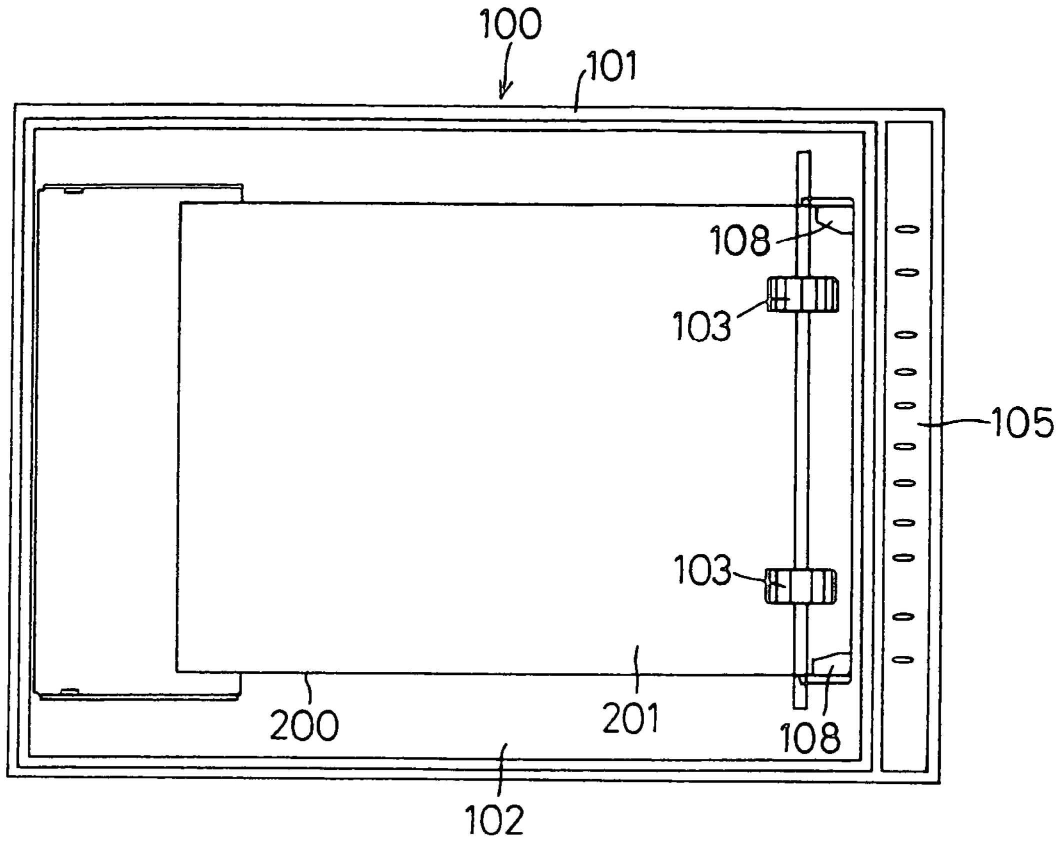
FIG. 7A PRIOR ART
FIGS. 7A and 7B are schematic views showing the conveyance mechanism of a paper feeding apparatus.
Figure 7B:
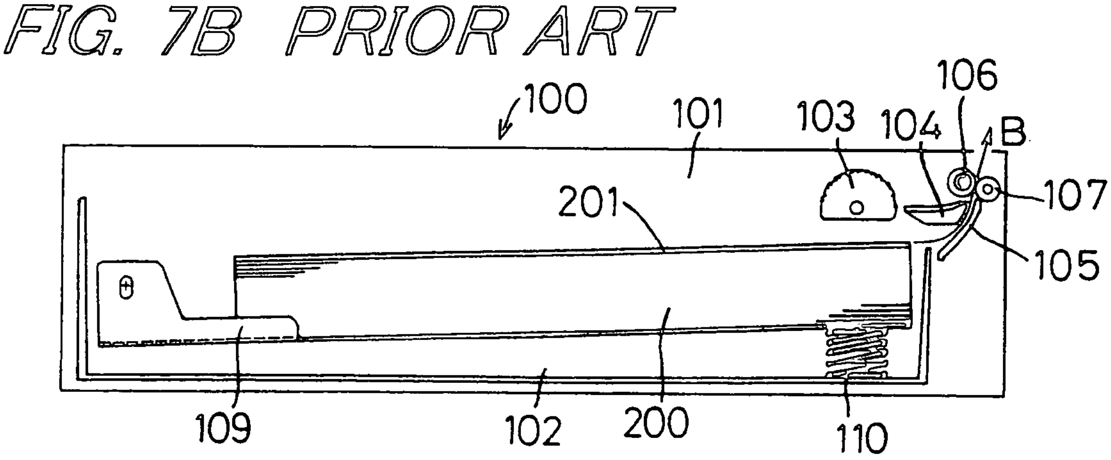
FIG. 7B PRIOR ART

FIGS. 6C and 6D are views showing a lower guide 24*a* according to still another embodiment of the invention. FIG. 6C is a perspective view of the lower guide 24*a*, while FIG. 6D is a sectional view of the lower guide 24*a*. Regarding the shape of the lower guide, the notches or the recesses need not always be formed, but ribs 34 and 35 having a plurality of different heights may well be formed over substantially the whole guide surface of the lower guide 24*a*, as shown in FIGS. 6*c* and 6D. In this case, the ribs 34 disposed at the widthwise middle part of the lower guide are made higher than the ribs 35 disposed near the end parts thereof. A difference in height between the ribs 34 disposed at the widthwise middle part and the ribs 35 disposed near the end parts is set at a height at which the deformed corner part of the recording paper does not touch the ribs 35 disposed near the end parts, for example, at 5 mm. Thus, like the above-mentioned embodiment, the bending or jamming of the recording paper attributed to the touch between the deformed corner part of the recording paper and the lower guide 24*a* can be prevented from occurring. It is accordingly permitted to cope with the abrupt change of the conveyance path attendant upon the reduction of the size of the apparatus, and the raise of the paper feed speed of the apparatus. The overall image forming processing speed of the image forming apparatus 1 can be heightened by raising the paper feed speed.

In addition, each of the lower guides stated above is fixed at both its widthwise end parts to the paper feeding apparatus body, etc. Therefore, the notches or the recesses need to be provided in the predetermined regions of the lower guide. However, in a case where a lower guide can be fixed at its widthwise middle part to the paper feeding apparatus body, etc., it may well have a width which corresponds to the width of the widthwise middle part of the recording paper, namely, the distance between the two pickup rollers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A paper feeding apparatus, comprising:

holding means for holding a plurality of sheet-like recording media;

separation means for separating a single recording medium from the recording media held by the holding means;

movement means for moving the separated recording medium in a predetermined direction; and guide means for guiding a lower surface of the moving recording medium along a predetermined conveyance path, the guide means being a plate-like member and having a predetermined region and a remaining region, the predetermined region being formed adjacent to the remaining region in a direction perpendicular to a conveyance direction of the recording medium, such that the recording medium make contact only with the remaining region and not with the predetermined region.

2. The paper feeding apparatus of claim 1, wherein notches are provided in the predetermined region.

3. The paper feeding apparatus of claim 1, wherein recesses are provided in the predetermined region.

4. The paper feeding apparatus of claim 1, wherein the predetermined region include a region which correspond to a corner part of the recording medium to-be-guided.

5. A paper feeding apparatus, comprising:

holding means for stacking and holding a plurality of sheet-like recording media;

separation means for separating a single recording medium from the stacked recording media by separation pawls;

movement means for moving the separated recording medium in a predetermined direction; and guide means for guiding a lower surface of the moving recording medium along a predetermined conveyance path, the guide means being a plate-like member and formed with a space for resuming original states of deformed parts of the recording medium having been deformed during the separation by the separation means, for guiding the moving recording medium along a predetermined conveyance path, the space being formed only at a region corresponding to a corner portion of the recording medium to-be guided.

6. An image forming apparatus, comprising:

a paper feeding apparatus including:

holding means for holding a plurality of sheet-like recording media, separation means for separating a single recording medium from the recording media held by the holding means, movement means for moving the separated recording medium in a predetermined direction, and guide means for guiding a lower surface of the moving recording medium along a predetermined conveyance path, the guide means being a plate-like member and having a predetermined region and a remaining region, the predetermined region being formed adjacent to the remaining region in a direction perpendicular to a conveyance direction of the recording medium, such that the recording medium make contact only with the remaining region and not with the predetermined regions; and an image forming apparatus body for forming an image on the recording medium fed from the paper feeding apparatus.

7. The image forming apparatus of claim 6, wherein notches are provided in the predetermined regions.

8. The image forming apparatus of claim 6, wherein recesses are provided in the predetermined regions.

9. The image forming apparatus of claim 6, wherein the predetermined region includes a region that corresponds to a corner part of the recording medium to-be-guided.

10. An image forming apparatus, comprising:

a paper feeding apparatus including:

holding means for stacking and holding a plurality of sheet-like recording media, separation means for separating a single recording medium from the stacked recording media by separation pawls, movement means for moving the separated recording medium in a predetermined direction, and guide means for guiding a lower surface of the moving recording medium along a predetermined conveyance path, the guide means being a plate-like member and formed with a space for resuming original states of deformed parts of the recording medium having been deformed during the separation by the separation means, for guiding the moving recording medium along a predetermined conveyance path, the space being formed only at a region corresponding to a corner part of the recording medium to-be guided; and an image forming apparatus body for forming an image on the recording medium fed from the paper feeding apparatus.

* * * * *